US008036181B2

United States Patent
Pan et al.

(10) Patent No.: US 8,036,181 B2
(45) Date of Patent: *Oct. 11, 2011

(54) METHOD AND APPARATUS FOR REDUCING MULTI-USER PROCESSING IN WIRELESS COMMUNICATION SYSTEMS

(75) Inventors: Jung-Lin Pan, Smithtown, NY (US); Jaeyoung Kwak, Morganville, NJ (US); Donald M. Grieco, Manhassett, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/574,176

(22) Filed: Oct. 6, 2009

(65) Prior Publication Data

US 2010/0103985 A1    Apr. 29, 2010

Related U.S. Application Data

(63) Continuation of application No. 10/924,442, filed on Aug. 24, 2004, now Pat. No. 7,599,344.

(60) Provisional application No. 60/577,898, filed on Jun. 8, 2004.

(51) Int. Cl.
*H04B 7/216* (2006.01)
(52) U.S. Cl. ......... 370/335; 370/338; 370/341; 370/342
(58) Field of Classification Search .................. 370/203, 370/208, 335, 342; 375/130, 136, 142, 147, 375/148, 340, 346, 348
See application file for complete search history.

(56) References Cited

U.S. PATENT DOCUMENTS

| 6,064,689 | A | 5/2000 | Vollmer et al. |
|---|---|---|---|
| 6,466,611 | B1 | 10/2002 | Bachu et al. |
| 6,714,527 | B2 | 3/2004 | Kim et al. |
| 6,795,417 | B2 | 9/2004 | Zeira et al. |
| 7,031,284 | B2 | 4/2006 | Supplee et al. |
| 7,254,192 | B2 * | 8/2007 | Onggosanusi et al. ....... 375/340 |
| 7,539,236 | B2 | 5/2009 | Li |
| 2002/0101910 | A1 | 8/2002 | Karnin et al. |
| 2003/0063576 | A1 | 4/2003 | DiFazio |

(Continued)

FOREIGN PATENT DOCUMENTS

WO    01/58041    8/2001

(Continued)

OTHER PUBLICATIONS

Minn, et al., "Dynamic Assignment of Orthogonal Variable-Spreading-Factor Codes in W-CDMA," IEEE Journal on Selected Areas in Communications, vol. 18, No. 8, Aug. 2000, pp. 1429-1440.

(Continued)

*Primary Examiner* — Hassan Kizou
*Assistant Examiner* — Toan Nguyen
(74) *Attorney, Agent, or Firm* — Volpe and Koenig, P.C.

(57) ABSTRACT

A method and apparatus is disclosed for reducing multi-user processing at the receiver in wireless communication systems. Detected codes are grouped according to channel impulse response and a parent code is identified for each group of detected codes. A matrix A is constructed and joint detection is performed using the identified parent codes. Data symbols of the detected codes are obtained from the data symbols of the identified parent codes.

9 Claims, 4 Drawing Sheets

U.S. PATENT DOCUMENTS

| | | |
|---|---|---|
| 2003/0223398 A1 | 12/2003 | Haim et al. |
| 2004/0052236 A1 | 3/2004 | Hwang et al. |
| 2004/0100928 A1 | 5/2004 | Ben-David et al. |
| 2005/0094713 A1 | 5/2005 | Yellin |

FOREIGN PATENT DOCUMENTS

| | | |
|---|---|---|
| WO | 03/101001 | 12/2003 |
| WO | 03/107688 | 12/2003 |
| WO | 2004/010573 | 1/2004 |
| WO | 2004/079977 | 9/2004 |

OTHER PUBLICATIONS

Ha et al., Interference Suppression Based on Code Grouping and Groupwise Decorrelation in Multirate W-CDMA Downlink, IEICE Transactions on Communications, vol. E87-B, No. 10, pp. 3125-3129 (Oct. 2004).

Minn et al., "Dynamic Assignment of Orthogonal Variable-Spreading-Factor Codes in W-CDMA," IEEE Journal on Selected Areas in Communications, vol. 18, No. 8, Aug. 2000, pp. 1429-1440.

* cited by examiner

METHOD AND APPARATUS FOR REDUCING MULTI-USER PROCESSING IN WIRELESS COMMUNICATION SYSTEMS

CROSS REFERENCE TO RELATED APPLICATION(S)

This application is a continuation of U.S. patent application Ser. No. 10/924,442, filed Aug. 24, 2004, now U.S. Pat. No. 7,599,344, which claims the benefit of U.S. provisional application No. 60/577,898, filed Jun. 8, 2004, which is incorporated by reference as is full set forth.

FIELD OF INVENTION

The present invention relates to wireless communication systems. More particularly, the present invention relates reduced multi-user processing in wireless communication systems.

BACKGROUND

In code division multiple access (CDMA) communication systems, multiple communications may be simultaneously sent over a shared frequency spectrum. Each communication is distinguished by the code used to transmit the communication. Data symbols of a communication are spread using chips of the code. The number of chips used to transmit a particular symbol is referred to as the spreading factor. One common spreading factor is sixteen (16), where sixteen chips are used to transmit one symbol. By way of example, typical spreading factors (SF) are 16, 8, 4, 2 and 1 in TDD/CDMA communication systems.

In some CDMA communication systems, to better utilize the shared spectrum, the spectrum is time divided into frames having a predetermined number of time slots, such as fifteen time slots. This type of system is referred to as a hybrid CDMA/time division multiple access (TDMA) communication system. One such system, which restricts uplink communications and downlink communications to particular time slots, is a time division duplex communication (TDD) system.

One approach to receive the multiple communications transmitted within the shared spectrum is joint detection. In joint detection, the data from the multiple communications is determined together. The joint detector uses the, known or determined, codes of the multiple communications and estimates the data of the multiple communications as soft symbols. Some typical implementations for joint detectors use zero forcing block linear equalizers (ZF-BLE), Cholesky or approximate Cholesky decomposition or fast Fourier transforms.

Communications are received by a receiver at a particular spreading factor. The higher spreading factor at which communications are received, the more complicated it is to perform joint detection. It is therefore desirable to provide a method and apparatus to reduce the complexity of performing joint detection in wireless communication systems.

SUMMARY

The present invention is a method and apparatus for reducing multi-user processing at a receiver in wireless communication systems. Detected codes are grouped according to channel impulse response and a parent code is identified for each group of detected codes. A matrix A is constructed and joint detection is performed using the identified parent codes. Data symbols of the detected codes are obtained from the data symbols of the identified parent codes.

BRIEF DESCRIPTION OF THE DRAWING(S)

DETAILED DESCRIPTION OF THE PREFERRED EMBODIMENT(S)

Although the features and elements of the present invention are described in the preferred embodiments in particular combinations, each feature or element can be used alone (without the other features and elements of the preferred embodiments) or in various combinations with or without other features and elements of the present invention.

Herein, a wireless transmit/receive unit (WTRU) includes but is not limited to a user equipment, mobile station, fixed or mobile subscriber unit, pager, or any other type of device capable of operating in a wireless environment. When referred to herein, a base station includes but is not limited to a Node-B, site controller, access point or any other type of interfacing device in a wireless environment.

Figure 1:
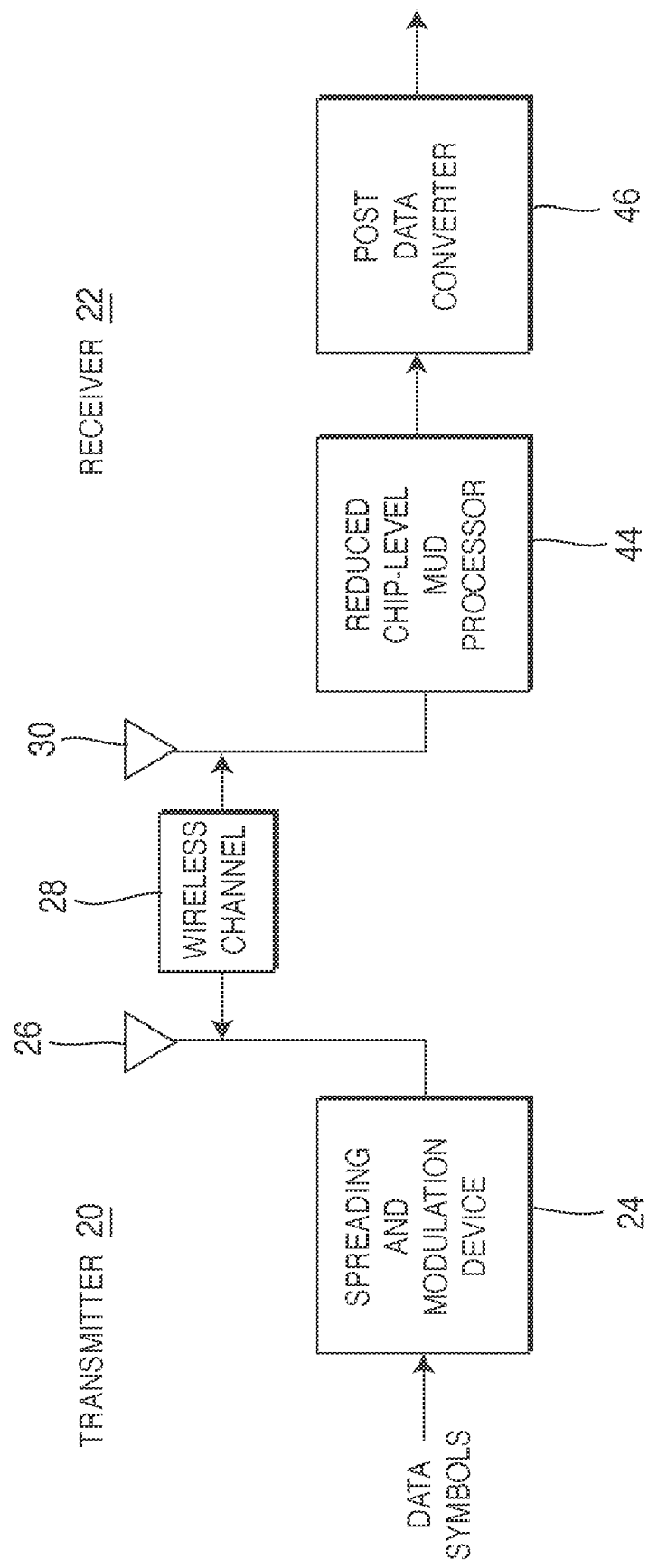
FIG. 1 is a transmitter and receiver having a reduced chip-level multi-user detection (MUD) processor and a post data converter.

Referring initially to FIG. 1, there is shown a transmitter 20 and a receiver 22. The transmitter may be located at a WTRU or multiple transmitting circuits 20 may be located at a base station. The receiver may be located at either the WTRU, base station, or both.

The receiver 22 includes a reduced chip level multi-user detection (MUD) processor 44 and a post data converter 46. Generally, the processor 44 groups detected codes according to their channel impulse responses and performs joint detection using the detected codes' parent codes for detected codes having the same channel impulse response (e.g. the codes in a downlink transmission or the codes emanating from the same user in an uplink transmission). Joint detection is performed on individual detected codes themselves where such detected codes have a channel impulse response that is not shared by at least one other detected code (i.e. the detected codes are considered parent codes in this case). The post data converter 46 is configured to convert back data symbols of parent codes to the data symbols of the parent codes' respective originally detected codes.

Figure 2:
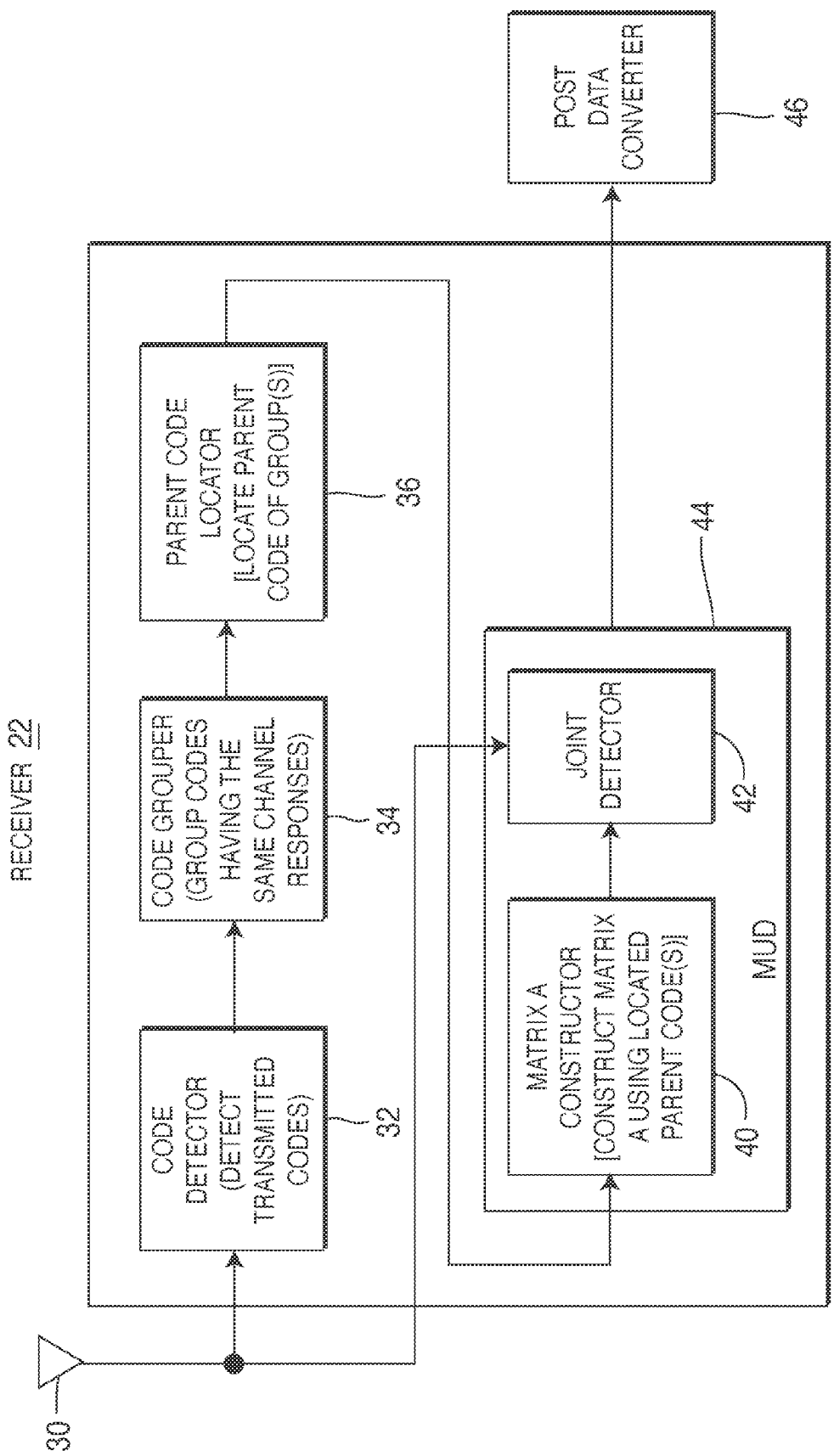
FIG. 2 is a block diagram of components within the reduced chip level MUD processor.

More specifically, referring now to FIG. 2, the receiver 22 includes a code detector 32, code grouper 34, parent code locator 36, and multi-user detector (MUD) 44. When a communication is received at a particular spreading factor, the code detector 32 detects the transmitted codes. Then, the code grouper 34 groups the codes having the same channel impulse responses (i.e. groups the codes of a single user). Typically, a single incoming communication is from a single user and therefore all of the detected codes often have the same channel impulse response resulting in a single group. Of course, there may also be situations where there is a plurality of groups. For each group of detected codes, the parent code locator 36 identifies a parent code. As mentioned above, where a detected code has a unique channel impulse response (i.e. the detected code does not have the same channel impulse response as any other detected code), the detected code is considered the detected code's respective parent code.

Once the parent codes are identified, a matrix A constructor 40 of the MUD 44 constructs a matrix A using the parent codes. Matrix A, which as known to those skilled in the art is a channel/code convolutional matrix, is constructed and provided to a joint detector 42 of the MUD 44. The joint detector 42 uses matrix A to estimate soft symbols of the spread data. Performing joint detection using the parent codes as opposed to the detected codes results in significantly less complexity at the joint detector 42. The soft symbols estimated by the joint detector 42 are input of the post data converter 46, which converts the estimated soft symbols back to the original data symbols of the originally detected codes.

Figure 3:
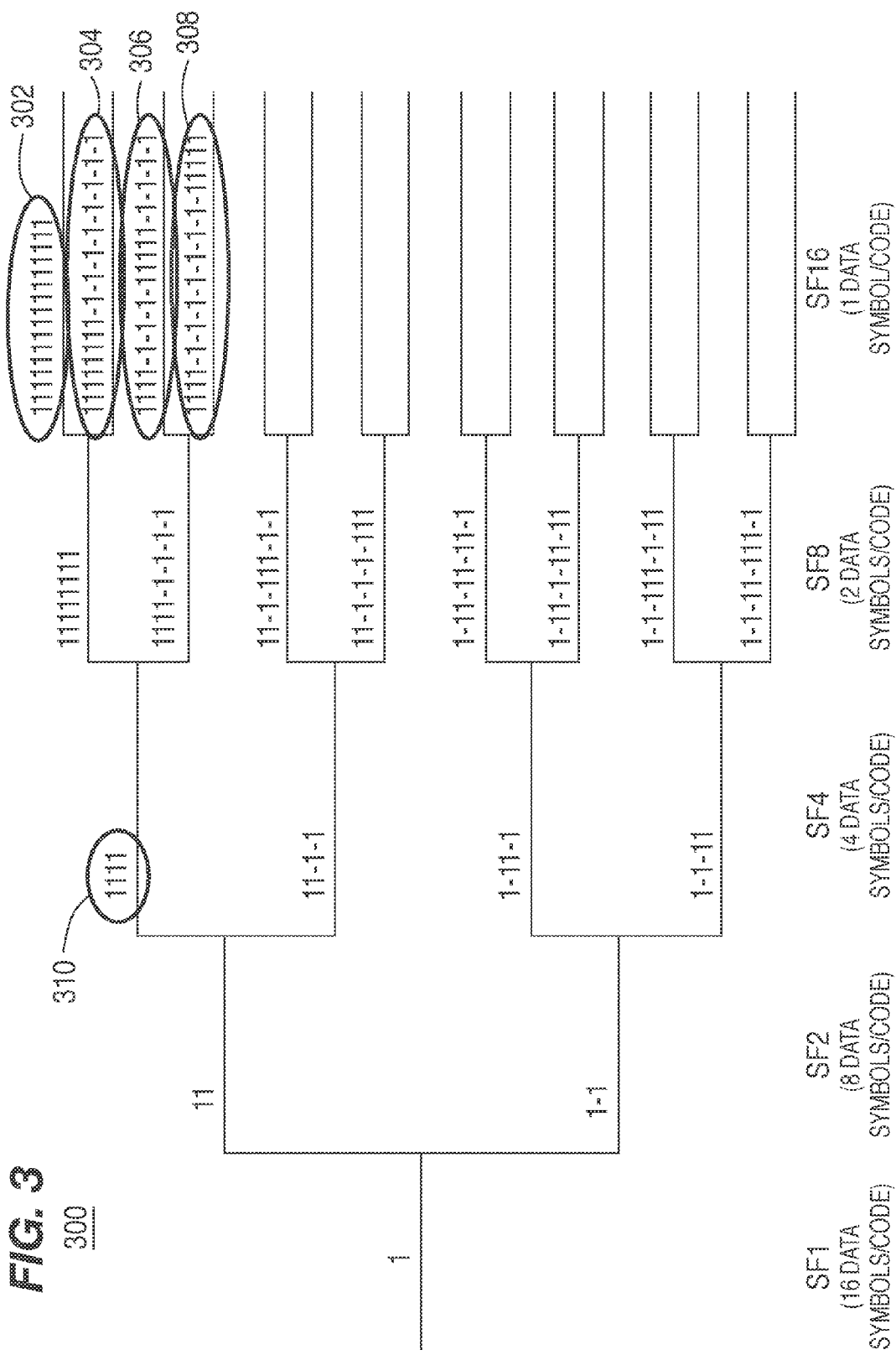
FIG. 3 is an illustration of a tree structure of orthogonal variable spreading factor (OVSF) codes.

Referring now to FIG. 3, an orthogonal variable spreading factor (OVSF) code tree 300 is shown. The inventors have recognized that within each level of codes having a particular spreading factor (SF) in an OVSF code tree 300, there may be groupings of codes based upon a unique higher level code (i.e. a code having a lower SF). As used herein, a group of codes of a given level has a parent code if all codes of the group are based upon the parent code and no other code of the given level is based upon the parent code.

To provide an example, assume a communication having four codes with the same channel impulse response is received at a SF of 16. The four codes 302, 304, 306, 308 are detected and grouped together. Then, the detected codes 302, 304, 306, 308 are traced back up the OVSF tree 300 as far as possible to identify a parent code 310 which is a parent to each of the detected codes 302, 304, 306, 308 and only those detected codes 302, 304, 306, 308. Parent code 310 is the only code in the OVSF code tree 300 that is a parent code to each of the detected codes 302, 304, 306, 308 and only the detected codes 302, 304, 306, 308.

For convenience, the parent code 310 (i.e. 1111) is referred to as C and the detected codes 302, 304, 306, 308 therefore are CCCC, CCC'C', CC'CC', and CC'C'C, respectively, where C' is −1−1−1−1. The data symbols corresponding to the detected codes 302, 304, 306, 308 are as follows:

CC CC ← - - - → $d^{SF16,1}$
CC C'C' ← - - - → $d^{SF16,2}$
CC'CC' ← - - - → $d^{SF16,3}$
CC'C'C ← - - - → $d^{SF16,4}$ where $d^{SF16,i}$, i=1, 2, 3, 4 is the data symbol of the i-th code of the four detected codes 302, 304, 306, 308 respectively.

In an OVSF code tree 300, the number of data symbols associated with a particular code varies depending on the code's SF. For example, within a 16-chip duration, a code with a SF of 16 can carry one data symbol, a code with a SF of 8 can carry two data symbols, a code with a SF of 4 can carry four data symbols, a code with a SF of 2 can carry eight data symbols, and a code with a SF of 1 can carry 16 data symbols. Further, parent codes can carry the same data symbols as their children codes, but the data symbols carried by a parent code are processed sequentially while the data symbols carried by the parent code's children codes are processed in parallel.

Therefore, in FIG. 3, parent code 310 includes information necessary to decode data symbols of detected codes 302, 304, 306, 308. The first data symbol of parent code 310 includes information for decoding the data symbol carried by the first four bits of detected codes 302, 304, 306, 308. The second data symbol of parent code 310 includes information for decoding the data symbol carried by the second four bits of detected codes 302, 304, 306, 308. The third data symbol of parent code 310 includes information for decoding the data symbol carried by the third four bits of detected codes 302, 304, 306, 308. The fourth data symbol of parent code 310 includes information for decoding the data symbol carried by the fourth four bits of detected codes 302, 304, 306, 308. The relationship between the data symbols of the parent code 310 and the data symbols of the detected codes 302, 304, 306, 308 may be expressed as follows:

$$d_1^{SF4} = d^{SF16,1} + d^{SF16,2} + d^{SF16,3} + d^{SF16,4}$$

$$d_2^{SF4} = d^{SF16,1} + d^{SF16,2} - d^{SF16,3} - d^{SF16,4}$$

$$d_3^{SF4} = d^{SF16,1} - d^{SF16,2} + d^{SF16,3} - d^{SF16,4}$$

$$d_4^{SF4} = d^{SF16,1} - d^{SF16,2} - d^{SF16,3} + d^{SF16,4}$$

where $d_i^{SF4}$, i=1, 2, 3, 4 are the four data symbols of the parent code 310. As explained above, the total number of data symbols carried by parent code 310 and detected codes 302, 304, 306, and 308 are the same, but the data symbols of parent code 310 are processed sequentially while the data symbols of detected codes 302, 304, 306, and 308 are processed in parallel.

In the above example, the parent code 310 is used for constructing matrix A and for performing joint detection. This results in significantly less complexity at the MUD than using detected codes 302, 304, 306, and 308. The original data symbols carried by detected codes 302, 304, 306, and 308 are recovered by the post data converter 46. In one embodiment, the original data symbols may be obtained according to:

$$d^{SF16,1} = \frac{1}{4}(d_1^{SF4} + d_2^{SF4} + d_3^{SF4} + d_4^{SF4})$$

$$d^{SF16,2} = \frac{1}{4}(d_1^{SF4} + d_2^{SF4} - d_3^{SF4} - d_4^{SF4})$$

$$d^{SF16,3} = \frac{1}{4}(d_1^{SF4} - d_2^{SF4} + d_3^{SF4} - d_4^{SF4})$$

$$d^{SF16,4} = \frac{1}{4}(d_1^{SF4} - d_2^{SF4} - d_3^{SF4} + d_4^{SF4})$$

As can be seen from the above relationship, converting back to the original data symbols requires only four additions and one multiplication for each of the parent code's 310 four data symbols.

Figure 4:
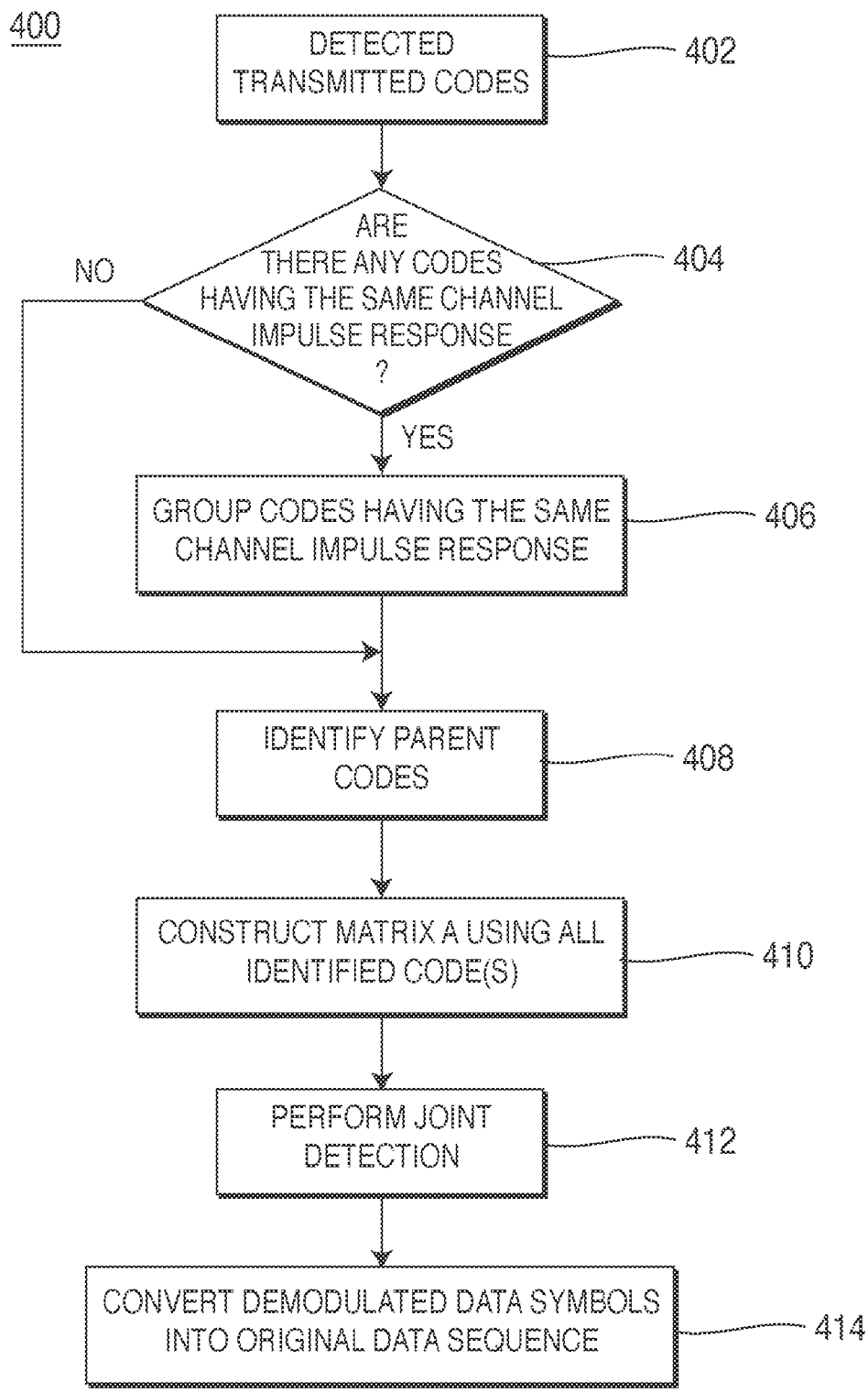
FIG. 4 is a flow chart for grouping detected codes according to their channel impulse response and performing joint detection using parent codes having a lower spreading factor for detected codes having the same channel impulse response.

Referring now to FIG. 4, there is shown a flow chart of a method 400 for grouping detected codes according to their channel impulse response and performing joint detection using parent codes having a lower spreading factor for detected codes having the same channel impulse response. The method 400 begins in step 402 with detecting transmitted codes in a received communication. Then, it is determined whether there are any detected codes having the same channel impulse response. If there are detected codes having the same channel impulse response, those detected codes are group together in step 406 and the method 400 proceeds to step 408. If there are no detected codes with the same channel impulse response, the method proceeds directly to step 408.

In step 408, a parent code(s) is identified for each group of detected codes. Then, in step 410, the identified parent code(s) are used to construct matrix A. Matrix A is provided to a joint detector and joint detection is performed in step 412. In step 414, the demodulated data symbols are converted back to the original data symbols of the codes detected in step 402.

It is noted that to reduce the complexity at a receiver a transmitter should use lower spreading factors for code transmission, and the receiver should use the same spreading factors as the transmitter for despreading and demodulation. However, when the transmitter uses higher spreading factors for transmission the receiver can still reduce complexity by using lower spreading factors for despreading and demodulation and using a post data converter to recover the original data symbols of higher spreading factors from data symbols of lower spreading factors.

It is important to note that the present invention may be implemented in any type of wireless communication system employing orthogonal codes. By way of example, the present invention may be implemented in CDMA2000, UMTS-TDD, UMTS-FDD, TDSCDMA, any type of WLAN system including any type of 802.xx system, or any other type of wireless communication system. Further, while the present invention has been described in terms of various embodiments, other variations, which are within the scope of the invention as outlined in the claim below will be apparent to those skilled in the art

What is claimed is:

1. In a wireless transmit receive unit (WTRU), a method for receiving wireless communications, comprising:
   detecting codes included in a received signal;
   grouping the detected codes having the same channel impulse response;
   for each group, identifying a parent code, wherein detected the codes having unique channel impulse responses are considered parent codes; and
   recovering data symbols of the detected codes using the identified parent codes.

2. The method of claim 1 further comprising:
   constructing a matrix using each identified parent code.

3. The method of claim 2, wherein recovering data symbols includes:
   performing joint detection to estimate soft symbols using the matrix; and
   converting the estimated soft symbols of the detected codes.

4. The method of claim 1 wherein the parent codes are orthogonal variable spreading factor (OVSF) codes.

5. A wireless transmit receive unit (WTRU) comprising:
   a code detector configured to detect codes included in a received signal;
   a code grouper configured to group the detected codes having the same channel impulse response;
   a parent code locator configured to identify a parent code, wherein the detected codes having unique channel impulse response are considered parent codes; and
   a multi-user detector (MUD) configured to recover data symbols of the detected codes using the identified parent codes.

6. The WTRU of claim 5, wherein the MUD is configured to further construct a matrix using each identified parent code.

7. The method of claim 6, wherein the MUD comprises a joint detector configured to perform joint detection to estimate soft symbols using the matrix.

8. The WTRU of claim 7, further comprising a post data converter configured to convert the estimated soft symbols to the data symbols of the detected codes.

9. The WTRU of claim 5, wherein the parent codes are orthogonal variable spreading factor (OVSF) codes.

* * * * *

UNITED STATES PATENT AND TRADEMARK OFFICE
CERTIFICATE OF CORRECTION

| | | |
|---|---|---|
| PATENT NO. | : 8,036,181 B2 | Page 1 of 1 |
| APPLICATION NO. | : 12/574176 | |
| DATED | : October 11, 2011 | |
| INVENTOR(S) | : Pan et al. | |

It is certified that error appears in the above-identified patent and that said Letters Patent is hereby corrected as shown below:

ON THE TITLE PAGE

Item (75) inventor, page 1, left column, after "M. Grieco," delete "Manhassett" and insert --Manhasset--.

At Claim 1, column 5, lines 27-28, after "parent code", delete "wherein detected the codes" and insert --wherein the detected codes--.

Signed and Sealed this
Twenty-fourth Day of April, 2012

David J. Kappos
*Director of the United States Patent and Trademark Office*